US011466335B2

(12) United States Patent
Uta et al.

(10) Patent No.: US 11,466,335 B2
(45) Date of Patent: Oct. 11, 2022

(54) HIGH STRENGTH STEEL SHEET HAVING EXCELLENT FORMABILITY AND A METHOD OF MANUFACTURING THE STEEL SHEET

(71) Applicant: ArcelorMittal, Luxembourg (LU)

(72) Inventors: Elena Uta, Montigny les Metz (FR); Veronique Hebert, Saint-Julien-les-Metz (FR)

(73) Assignee: ArcelorMittal, Luxembourg (LU)

( * ) Notice: Subject to any disclaimer, the term of this patent is extended or adjusted under 35 U.S.C. 154(b) by 617 days.

(21) Appl. No.: 16/069,804

(22) PCT Filed: Jan. 17, 2017

(86) PCT No.: PCT/IB2017/000018
§ 371 (c)(1),
(2) Date: Jul. 12, 2018

(87) PCT Pub. No.: WO2017/125809
PCT Pub. Date: Jul. 27, 2017

(65) Prior Publication Data
US 2021/0040576 A1     Feb. 11, 2021

(30) Foreign Application Priority Data

Jan. 18, 2016   (WO) .................. PCT/IB2016/000024

(51) Int. Cl.
*C21D 9/46*     (2006.01)
*B32B 15/01*    (2006.01)
(Continued)

(52) U.S. Cl.
CPC ............. *C21D 9/46* (2013.01); *B32B 15/013* (2013.01); *C21D 6/002* (2013.01); *C21D 6/005* (2013.01);
(Continued)

(58) Field of Classification Search
CPC ...... C21D 9/46; C21D 8/0205; C21D 8/0236; C21D 8/0226; C21D 6/008; C21D 6/002;
(Continued)

(56) References Cited

U.S. PATENT DOCUMENTS 7,979,194 B2   4/2011   Kawamura et al.
8,795,442 B2   8/2014   Mukai et al.
(Continued)

FOREIGN PATENT DOCUMENTS

CN   103857819        6/2014
EP   2765212 A1 *    8/2014   ............. C21D 6/008
(Continued)

OTHER PUBLICATIONS

Search Report of PCT/IB2017/000018, dated Apr. 20, 2017.
(Continued)

*Primary Examiner* — Anthony J Zimmer
*Assistant Examiner* — Jacob J Gusewelle
(74) *Attorney, Agent, or Firm* — Davidson, Davidson & Kappel, LLC

(57) ABSTRACT

A cold rolled and heat treated steel sheet is provided. The steel sheet includes a composition including 0.17%≤carbon≤0.24%, 1.9%≤manganese≤2.2%, 0.5%≤aluminum≤1.2%, 0.5%≤silicon≤1%, Si+Al≥1.3%, 0.05%≤chromium≤0.2%, 0.015%≤niobium≤0.03%, sulphur≤0.003%, phosphorus≤0.03% and optionally 0.005%≤titanium≤0.05%, 0.001%≤molybdenum≤0.05%, a remainder of the composition including iron and the unavoidable impurities. A microstructure of the coated steel sheet includes, in area fraction, 10 to 20% residual austenite, said austenite phase having a carbon content between 0.9 to 1.1%, 40 to 55% polygonal ferrite, 15 to 40% granular bainite and at
(Continued)

least 5% tempered martensite, a sum of tempered martensite and residual austenite being between 20 to 30%. A method is also provided.

27 Claims, 1 Drawing Sheet

(51) Int. Cl.

| | |
|---|---|
| *C21D 6/00* | (2006.01) |
| *C21D 8/02* | (2006.01) |
| *C22C 38/00* | (2006.01) |
| *C22C 38/02* | (2006.01) |
| *C22C 38/06* | (2006.01) |
| *C22C 38/44* | (2006.01) |
| *C22C 38/48* | (2006.01) |
| *C22C 38/50* | (2006.01) |
| *C22C 38/58* | (2006.01) |
| *C23C 2/06* | (2006.01) |
| *C23C 2/28* | (2006.01) |
| *C23C 2/40* | (2006.01) |

(52) U.S. Cl.
CPC ........... *C21D 6/008* (2013.01); *C21D 8/0205* (2013.01); *C21D 8/0226* (2013.01); *C21D 8/0236* (2013.01); *C21D 8/0263* (2013.01); *C22C 38/001* (2013.01); *C22C 38/002* (2013.01); *C22C 38/02* (2013.01); *C22C 38/06* (2013.01); *C22C 38/44* (2013.01); *C22C 38/48* (2013.01); *C22C 38/50* (2013.01); *C22C 38/58* (2013.01); *C23C 2/06* (2013.01); *C23C 2/28* (2013.01); *C23C 2/40* (2013.01); *C21D 2211/001* (2013.01); *C21D 2211/002* (2013.01); *C21D 2211/008* (2013.01)

(58) Field of Classification Search
CPC ............................ C21D 8/0263; C21D 6/005; C21D 2211/008; C21D 2211/002; C21D 2211/001; C22C 38/50; C22C 2/28; C22C 38/48; C22C 38/58; C22C 38/001; C22C 2/06; C22C 38/02; C22C 38/002; C22C 38/06; C22C 2/40; C22C 38/44; B32B 15/013
See application file for complete search history.

(56) References Cited

U.S. PATENT DOCUMENTS

| | | | |
|---|---|---|---|
| 8,876,987 | B2 | 11/2014 | Matsuda et al. |
| 8,951,366 | B2 | 2/2015 | Sano et al. |
| 9,074,272 | B2 | 7/2015 | Akamizu et al. |
| 9,551,055 | B2 | 1/2017 | Sate et al. |
| 10,435,763 | B2 | 10/2019 | Hammer et al. |
| 2014/0178712 | A1 | 6/2014 | Maruyama et al. |
| 2015/0034218 | A1* | 2/2015 | Krizan .................... C22C 38/32 148/623 |
| 2015/0152533 | A1* | 6/2015 | Bongards ................. C23C 2/06 148/330 |
| 2017/0029914 | A1 | 2/2017 | Hayashi |

FOREIGN PATENT DOCUMENTS

| | | |
|---|---|---|
| EP | 2765212 A1 | 8/2014 |
| JP | 2001254138 A | 9/2001 |
| JP | 2011-017046 A | 1/2011 |
| JP | 2012041573 A | 3/2012 |
| JP | 2012251201 A | 12/2012 |
| JP | 2015014026 A | 1/2015 |
| JP | 2017514989 A | 6/2017 |
| KR | 20140068207 A | 6/2014 |
| RU | 2418090 C2 | 5/2011 |
| RU | 2562582 C1 | 9/2015 |
| WO | WO2011/093319 | 8/2011 |
| WO | WO2013/047808 | 4/2013 |
| WO | WO2013/051238 | 4/2013 |
| WO | 2013144373 A1 | 10/2013 |
| WO | WO2015080242 A1 | 6/2015 |

OTHER PUBLICATIONS

H.P. Hougardy: "Darstellung der Umwandlungen für technische Anwendungen und Möglichkeiten ihrer Beeinflussung," Werkstoffkunde Stahl Band 1, 198-231, Verlag Stahleisen, Düsseldorf, 1984, mentioned in specification of present application, machine translation also submitted.

* cited by examiner

HIGH STRENGTH STEEL SHEET HAVING EXCELLENT FORMABILITY AND A METHOD OF MANUFACTURING THE STEEL SHEET

The present invention relates to a steel sheet having excellent mechanical properties suitable for use in manufacturing of automobiles, in particular, the present invention possesses high formability with high strength and a method of manufacturing the steel sheet.

BACKGROUND

In recent years, increased emphasis on fuel economy and carbon footprint from a view point of global environment conservation has needed the reduction of weight of automobiles; consequently the development of steel sheets having higher strength, elongation and acceptable mechanical properties is required. Hence the automobile steel parts are required to satisfy two characteristics which are generally considered as difficult to obtain together: high formability and ductility on one side and high tensile strength on the other side.

Intense research and development efforts have been made to reduce the amount of car weight by increasing the strength of material. Conversely, an increase in strength of steel sheets decreases formability, and thus development of materials having both high strength and high formability is needed.

Therefore high strength steels having excellent formability such as TRIP ("Transformation Induced Plasticity") Steels have been developed. TRIP steels offer a good balance between mechanical strength and formability due to their complex structure including austenite which transforms progressively with strain. TRIP steels can also include ferrite, which is a ductile component and components such as islands of martensite and austenite (MA) and bainite. TRIP steels have a very high capacity for consolidation, which makes possible a good distribution of the deformations in the case of a collision or even during the forming of the automobile part. It is therefore possible to fabricate parts which are as complex as those made of conventional steels but with improved mechanical properties, which in turn makes it possible to reduce the thickness of the parts to comply with identical functional specifications in terms of mechanical performance. These steels are therefore an effective response to the requirements of reduced weight and increased safety in vehicles. In the field of hot-rolled or cold-rolled steel sheet, this type of steel has applications for, among other things, structural and safety parts for automotive vehicles. Some attempts have been made to provide steel with high strength and high formability, which have resulted in variety of high strength, and high formability steels and methods for producing high strength and high formability steel sheets.

U.S. Pat. No. 9,074,272 describes steels that have the chemical composition: 0.1-0.28% C, 1.0-2.0% Si, 1.0-3.0% Mn and the remainder consisting of iron and the inevitable impurities. The microstructure contains 9 to 17% of residual austenite, 40 to 65% of bainitic ferrite, 30 to 50% of polygonal ferrite and less than 5% martensite. It refers to a cold rolled steel sheet with excellent elongation but the invention described in U.S. Pat. No. 9,074,272 fails to achieve a tensile strength of 900 MPa which is now requested for a number of structural automotive parts.

US 2015/0152533 discloses a method for producing a high strength steel which contains C: 0.12-0.18%, Si: 0.05-0.2%, Mn: 1.9-2.2%, Al: 0.2-0.5%, Cr: 0.05-0.2%, Nb: 0.01-0.06%, P: ≤0.02%, S: ≤0.003%, N: ≤0.008%, Mo: ≤0.1%, B: ≤0.0007%, Ti: ≤0.01%, Ni: ≤0.1%, Cu: ≤0.1% and, as the remainder, iron and unavoidable impurities. The steel sheet has a microstructure that consists of 50-90% by volume ferrite, including bainitic ferrite, 5-40% by volume martensite, up to 15% by volume residual austenite and up to 10% by volume other structural constituents. Even though the steel disclosed in US 2015/0152533 contains a substantial amount of martensite (i.e. up to 40%), this steel fails to achieve the tensile strength level of 900 MPa.

Further the document JP 2001/254138 describes steels that have the following chemical composition: 0.05-0.3% C, 0.3-2.5% Si, 0.5-3.0% Mn and 0.001-2.0% Al, the remainder consisting of iron and the inevitable impurities. The structure contains residual austenite in which the mass concentration of carbon is greater than or equal to 1% and which volume fraction is between 3 and 50%, as well as ferrite in an amount of 50 to 97%. This invention cannot be used to manufacture steels that require a particular mechanical strength associated with high ductility to form a complex structural part for an automotive vehicle.

Further EP2765212 proposes a high strength steel sheet having excellent ductility and stretch flangeability, having microstructure by area ratio consisting of martensite 5-70%, area ratio of retained austenite 5-40%, area ratio of bainitic ferrite in upper bainite 5% or more, and total thereof is 40% or more, 25% or more of martensite is tempered martensite, polygonal ferrite area ratio is above 10% and below 50%.

BRIEF SUMMARY OF THE INVENTION

Therefore, in the light of the publications mentioned above, an object of the invention is to provide a steel sheet that makes it possible to obtain higher weight reduction with capacity to fit in the present automotive manufacturing practices to produce complex automotive parts and members.

The purpose of the present invention is to solve these problems by making available cold-rolled steel sheets that simultaneously have:
- an ultimate tensile strength TS greater than or equal to 980 MPa and preferably above 1050 MPa, or even above 1100 MPa,
- a yield strength above 550 MPa,
- a yield ratio equal to or above 0.60,
- a total elongation TE greater than or equal to 17% and preferably above 19%,
- a hole expansion ratio higher than or equal to 18% (measured according to ISO standard 16630:2009).

The present invention provides a coated steel sheet with a composition comprising the following elements by weight:
   0.17%≤C≤0.24%,
   1.9%≤Mn≤2.2%,
   0.5%≤Si≤1%,
   0.5%≤Al≤1.2%,
   wherein Si+Al≥1.3%,
   0.05%≤Cr≤0.2%,
   0.015%≤Nb≤0.03%,
   S≤0.004%,
   P≤0.03%,
   and optionally containing one or more of the following elements:
   0.005%≤Ti≤0.05%,
   0.001%≤Mo≤0.05%, and
   a remainder, the remainder including Fe and unavoidable impurities resulting from smelting;

a microstructure of said coated steel sheet comprising, in area fraction, 10% to 20% residual austenite, said austenite phase having a carbon content between 0.9% to 1.1%, 40% to 55% polygonal ferrite, 15% to 40% granular bainite and at least 5% tempered martensite, a sum of tempered martensite and residual austenite being between 20% to 30%.

Preferably, such steel has a good suitability for forming, in particular for rolling and a good weldability and good coatability.

Another object of the present invention is to manufacture steel which is excellent in resistance to liquid metal embrittlement cracking.

Another object of the present invention is also to make available a method for the manufacturing of these sheets that is compatible with conventional industrial applications while being not too sensitive with respect to some small variations of the manufacturing parameters.

BRIEF DESCRIPTION OF THE DRAWINGS

FIG. 2A illustrates the homogenous distribution of tempered martensite in the steel sheet of the invention.

FIG. 2B illustrates the heterogeneous distribution of martensite in a reference steel sheet.

DETAILED DESCRIPTION OF THE INVENTION

Figure 1:
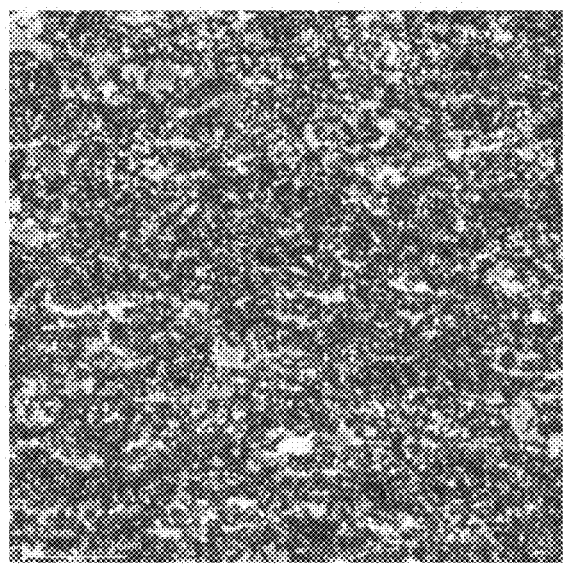
FIG. 1 is a micrograph illustrating microstructure of the steel of the present invention.
Figure 1:
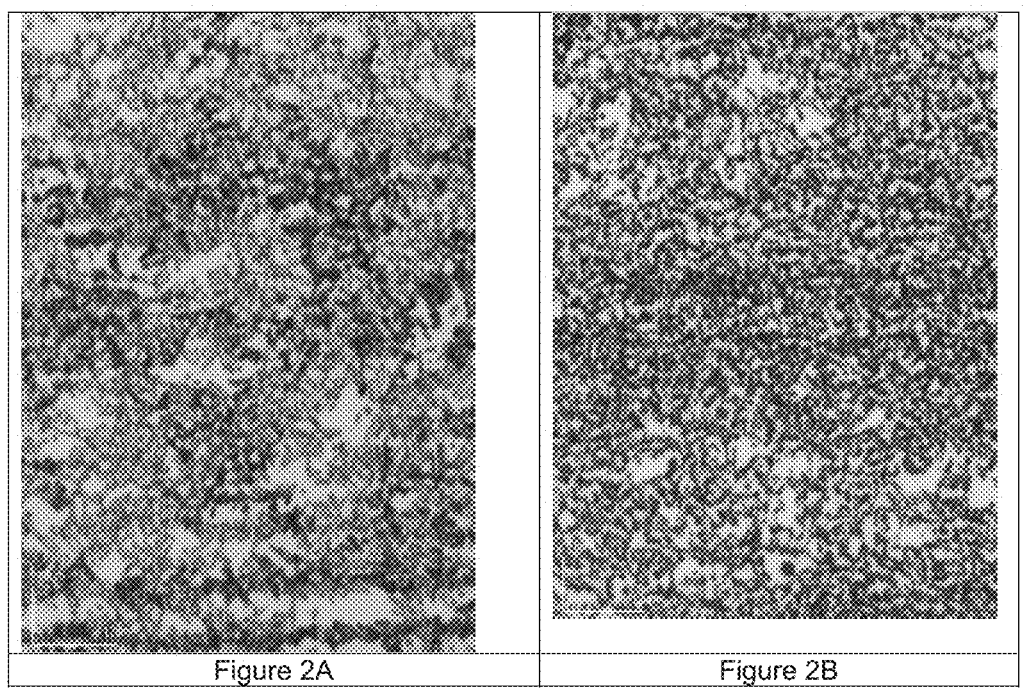

FIG. 1 is a micrograph illustrating microstructure of the steel of the present invention. The tempered martensite and austenite appear as pale constituents, the remaining part being ferrite and granular bainite. FIGS. 2A and 2B show the distribution of the martensite in the referenced steel sheet. Specifically, FIG. 2A shows the homogenous distribution of tempered martensite in the steel sheet of the invention, while FIG. 2B shows the heterogenous distribution of martensite in a reference steel sheet.

The steel sheet according to the invention presents a specific composition which will be detailed.

Carbon is present in the steel of present invention from 0.17% to 0.24%. Carbon plays a significant role in the formation of the microstructure and in the strength and ductility via the TRIP effect: it is not possible to obtain a significant TRIP effect when carbon is below 0.17%. Above 0.24%, the weldability is reduced. The carbon content is advantageously comprised between 0.20 and 0.24% inclusive to obtain simultaneously high strength and high elongation.

Manganese is added in the present steel in a content of 1.9% to 2.2% inclusive. Manganese is an element that provides hardening by solid solution substitution in ferrite. A minimum content of 1.9% by weight is necessary to obtain the desired tensile strength. Nevertheless, above 2.2%, Manganese retards the formation of bainite and further enhances the formation of austenite with a reduced amount of carbon which at later stage transforms into martensite rather than into residual austenite, which is detrimental for the requested properties.

Silicon is added in an amount of 0.5% to 1% to the steel of the present invention. Silicon plays an important role in the formation of the microstructure by slowing down the precipitation of carbides during the equalization step following the primary cooling, which makes it possible to concentrate the carbon in the austenite for its stabilization. Silicon plays an effective role combined with that of aluminum, the best results from which, with regard to the specified properties, are obtained in content levels above 0.5%. However, an addition of silicon in a quantity greater than 1% has an adverse effect on the hot-dip coatability by promoting the formation of oxides that adhere to the surface of the products, reducing weldability. It may also lead to liquid metal embrittlement by the liquid Zn penetration into the austenitic grain boundaries during the spot welding. A content less than or equal to 1% simultaneously provides very good suitability for welding as well as good coatability. The silicon content will preferably be between 0.7% and 0.9% inclusive to limit formation of brittle martensite instead of bainite.

Aluminum plays an important role in the invention by greatly slowing down the precipitation of carbides and stabilizing the residual austenite. This effect is obtained when the aluminum content is comprised between 0.5% and 1.2%. The aluminum content will preferably be less than or equal to 0.9% and greater than or equal to 0.7%. It is also generally thought that high levels of Al increase the erosion of refractory materials and the risk of plugging of the nozzles during casting of the steel upstream of the rolling. Aluminum also segregates negatively and can result in macro-segregations. In excessive quantities, aluminum reduces hot ductility and increases the risk of the appearance of defects during continuous casting. Without careful control of the casting conditions, micro and macro segregation defects ultimately result in a central segregation in the annealed steel sheet. This central band will be harder than its surrounding matrix and will adversely affect the formability of the material.

In addition to their individual limitations described above, the sum of aluminum and silicon must be above 1.3% and preferably above 1.4%, as both elements synergistically contribute towards the stabilization of the residual austenite, which significantly slow down the precipitation of carbides during the annealing cycle, and most particularly during the bainitic transformation. That makes it possible to obtain enrichment of the austenite with carbon, leading to its stabilization at room temperature in the steel sheet.

Moreover, the inventors have found that when Si/10>0.30%–C (Si and C being expressed in weight percentage), due to the LME (liquid metal embrittlement phenomenon), silicon is detrimental to the spot welding of coated sheets and particularly to galvanized or galvannealed or electro-galvanized sheets. LME occurrence causes cracks at grain boundaries in the heat affected zones and in the weld metal of welded joints. Therefore (C+Si/10) has to be maintained less than or equal to 0.30%, especially if the sheet is to be coated.

They have also found that to reduce the LME occurrence, for the domain of composition which is considered, the Al content has to be higher than or equal to 6(C+Mn/10)−2.5%.

Chromium is added to the steel of the present invention in an amount of 0.05% to 0.2%. Chromium as manganese increases hardenability in promoting the martensite formation. When chromium content is higher than 0.05%, it is useful to reach the requested tensile strength. However, when chromium content is higher than 0.2%, the bainite formation is delayed, so that the austenite is not sufficiently enriched in carbon during the equalization step; indeed this austenite is more or less totally transformed into martensite during the cooling to ambient temperature, and the elongation is too low. Thus, the chromium content is comprised between 0.05% and 0.2%

Niobium is added to the steel of the present invention in an amount of 0.015 to 0.03% to trigger the formation of carbo-nitrides to impart strength by precipitation hardening. Because niobium delays the recrystallization during heating, the microstructure formed at the end of the holding temperature and as a consequence after the complete annealing is finer, leading to the hardening of the product. But when the niobium content is above 0.03%, large amount of carbo-nitrides are formed and tend to reduce the ductility of the steel.

Titanium is an optional element which may be added to the steel of present invention in an amount of 0.005% to 0.05%. Similar to niobium, it precipitates to form carbo-nitrides and contributes to hardening. But it is also involved in the formation of large TiN appearing during solidification of the cast product. The amount of titanium is therefore limited to 0.05% to avoid coarse TiN that are detrimental for hole expansion. If the titanium content is added in an amount below 0.005% it does not impart any effect on the steel of present invention.

Molybdenum is an optional element which may be added to the steel of present invention in an amount of 0.001% to 0.05%. Molybdenum can play an effective role in increasing hardenability, delaying the bainite formation and avoiding carbides precipitation in bainite. However, the addition of molybdenum excessively increases the cost of the addition of alloy elements, so that for economic reasons its content is limited to 0.05%.

Sulphur content in the present invention must be kept as low as possible; hence the content of sulphur is below or equal to 0.004% in the present invention. Sulphur content of 0.004% or above reduces the ductility on account of the excessive presence of sulfides such as MnS (manganese sulfides), which reduce the workability of the steel, and is also a source for the initiation of cracks.

Phosphorus can be present in the steel of the invention in an amount up to 0.03%, Phosphorus is an element that hardens in solid solution but significantly reduces suitability for spot welding and hot ductility. For these reasons, its content must be limited to 0.03% to obtain good suitability for spot welding and good hot ductility.

The steel sheet of the invention has a specific microstructure including several phases, which amount is given in area fractions.

Polygonal ferrite constituent imparts the steel of the present invention with enhanced elongation and ensures elongation and hole expansion ratio at the required levels. Polygonal ferrite is a soft and intrinsically ductile constituent. It can be distinguished from regular ferrite that forms during the cooling step since it has low solid solution carbon content and a very low dislocation density. Polygonal ferrite must be present at least in an amount of 40% and up to a maximum level of 55%. Polygonal ferrite imparts elongation to the present invention due to its softness in comparison of other hard phase present such as tempered Martensite and because of the very limited amount of carbon present in polygonal ferrite which may be as low as 0.005%. Further the low density of dislocations also contributes towards hole expansion ratio. This polygonal ferrite is mainly formed during the heating and holding at a temperature corresponding to an intercritical annealing. Some amount of regular ferrite may be formed during the cooling but due to the manganese content, the regular ferrite content appearing in the cooling step is always less than 5%.

Granular bainite present in the steel of the present invention is distinct from the conventional bainite structure as the granular bainite of the present invention has a very low density of carbides. Low density of carbides herein means less than or equal to 100 carbides per area unit of 100 $\mu m^2$.

Because the dislocation density is high (near $10^{15}/m^{-2}$), this granular bainite imparts high strength to steel of present invention on the contrary of polygonal ferrite. The amount of the granular bainite is from 15% to 40%.

Residual austenite is present as a constituent in amount between 10 to 20% and is an essential constituent for ensuring the TRIP effect. The residual austenite of the present invention has a carbon percentage of 0.9 to 1.1% which plays an important role in stabilizing austenite at room temperature and enhancing the TRIP effect which provides the present invention with appropriate formability. Further, carbon-rich residual austenite also contributes to the formation of granular bainite as solubility of carbon in austenite is high which retards the formation of carbide in bainite. In a preferred embodiment, the average grain size of such residual austenite is lower than 2 $\mu m$. Residual austenite is measured by a magnetic method called sigmametry, which consists in measuring the magnetic moment of the steel before and after a thermal treatment which destabilizes the austenite which is paramagnetic on the contrary of the other phases which are ferromagnetic.

The steel of the invention contains also at least 5% of tempered martensite, which is a constituent composed of fine laths elongated in one direction inside each grain issued from a primary austenite grain, in which fine iron carbides are precipitated between the laths following the <111> direction. This tempering of the martensite allows increasing the yield strength thanks to the diminution of the hardness gap between martensite and ferrite or bainite and increases the hole expansion ratio for the same reason and because of the diminution of the martensite. The content of the sum of tempered martensite and residual austenite is between 20 and 30% and preferably between 25 and 30%. Tempered Martensite and austenite can be present either in the form of martensite-austenite islands, or in the form of distinct microstructures individually. The present steel does not contain any untempered martensite as untempered martensite is a hard phase and thereby will diminish the yield strength of the steel and will also decrease the formability of the steel of present invention.

In a preferred embodiment of the present invention, the homogeneity of the distribution of the tempered martensite content is characterized in the following manner: the tempered martensite fraction (TM) is measured on any area of 50×50 $\mu m^2$ in said steel sheet and compared to the mean fraction (TM*). The distribution of tempered martensite is defined homogeneous if $|(TM)-(TM^*)|\leq 1.5\%$. Such homogeneous repartition improves the hole expansion ratio.

The steel sheet according to the invention can be produced by any suitable process. However, it is preferred to use the process described hereunder.

Casting of a semi-finished product can be done in form of ingots or in form of thin slabs or thin strips, i.e. with a thickness ranging from approximately 220 mm for slabs up to several tens of millimeters for thin strip or slabs.

For the purpose of simplification, the under description will focus on slabs as semi-finished product. A slab having the above-described chemical composition is manufactured by continuous casting, and is provided for further processing as per the inventive method of manufacturing. Here, the slab can be used with a high temperature during the continuous casting or may be first cooled to room temperature and then reheated.

The temperature of the slab which is subjected to hot rolling is preferably above the Ac3 point and at least above 1000° C. and must be below 1280° C. The temperatures mentioned herein are stipulated to ensure that at all points in the slab reaches austenitic range. In case the temperature of the slab is lower than 1000° C., excessive load is imposed on a rolling mill, and further, the temperature of the steel may decrease to a ferrite transformation temperature during rolling. Hence to ensure rolling is in complete austenitic zone, reheating must be done above 1000° C. Further the temperature must not be above 1280° C. to avoid adverse growth of austenitic grain resulting in coarse ferrite grain which decreases the capacity of these grains to re-crystallize during hot rolling. Further temperature above 1280° C. enhance the risk of formation of thick layer oxides which are detrimental during hot rolling. The finishing rolling temperature must be above 850° C. It is preferred to have finishing rolling temperature above Ar3 point to ensure that the steel subjected to hot rolling is rolled in complete austenitic zone.

The hot rolled steel sheet obtained in this manner is then cooled with a cooling rate of 35 to 55° C./s to a coiling temperature equal or below 580° C. to obtain the requisite microstructure of the present invention as this range of cooling rate is conducive for the formation of bainite. The cooling rate must not be above 55° C./s in order to avoid excessive formation of martensite. The coiling temperature must be below 580° C., because above that temperature there is a risk of intensification of the micro-segregation and inter-granular oxidation. The preferred coiling temperature for the hot rolled steel sheet of the present invention is between 450 and 550° C.

Subsequently the hot rolled steel sheet is allowed to cool to room temperature with a cooling rate that is preferably not greater than 125° C./h.

Afterwards, pickling is performed on the hot-rolled steel sheet so as to remove scale, the hot rolled sheets are cold rolled with a thickness reduction typically between 30 to 90%.

The obtained cold rolled steel sheet obtained by cold rolling process is subjected to an inter-critical annealing and other subsequent heat treatment processes to impart the steel of the present invention with requisite mechanical properties and microstructure.

The cold rolled steel sheet is continuously annealed, with a heating rate of 1 to 20° C./s and preferably greater than 2° C./s, up to a soaking temperature between Ac1 and Ac3 and preferably between 780 and 950° C. is designed to ensure a ferrite to austenite ratio of from 60:40 to 35:65. The soaking is preferably performed during more than 10 seconds and has to be less than or equal to 600 seconds.

The sheet is then cooled at a rate higher than 25° C./s to the bainite temperature transformation range of 440 to 480° C. whereby preference is given to a cooling rate greater than or equal to 30° C./s. While not willing to be bound by a theory, the inventors believe that the homogeneity of martensite formation is notably due to this high cooling rate after annealing.

The steel sheet is then maintained at this temperature during 20 to 250 seconds, and preferably during 30 to 100 seconds so as to trigger bainite formation. Holding the cold rolled steel sheet for less than 20 s will lead to a too low quantity of bainite and not enough enrichment of austenite leading to a quantity of residual austenite lower than 10%. Above 250 s it will lead to the precipitation of carbides in bainite, depleting the austenite in carbon before the last cooling. This holding between 440 to 480° C. is performed to form granular bainite and to facilitate austenite enrichment in carbon.

The hot-dip galvanizing (GI) is then performed by immersion in a bath of zinc or zinc alloy, the temperature of which can be between 440 and 475° C. and then the GI product is allowed to cool down to the room temperature with a cooling rate of 1 to 20° C./s and preferably between 5 and 15° C./s to obtain residual austenite and limit martensite content.

The galvanized steel sheet is then subjected to a batch annealing treatment. During this batch annealing, the galvanized steel sheet is heated to a temperature between 170 to 350° C., preferably between 170 and 250° C., during 12 to 250 hours, preferably during 12 to 30 hours and then cooled down to room temperature. This is done to effectively temper the fresh martensite.

EXAMPLES

The following tests, examples, figurative exemplification and tables which are presented herein are non-restricting in nature and must be considered for purposes of illustration only, and will display the advantageous features of the present invention and expound the significance of the process parameters chosen by inventors after extensive experiments and further establish the properties that can be achieved by the steel of present invention.

Steel sheets compositions of the tests samples are gathered in Table 1, where the steel sheets are produced according to process parameters gathered in Table 2 respectively. Table 3 demonstrates the obtained microstructures and Table 4 shows the result of evaluations of use properties.

It must be emphasized that, due to differences in the methods of measurement, the values of hole expansion ratio HER according to the ISO standard are very different and not comparable to the values of the hole expansion ratio λ according to the JFS T 1001 (Japan Iron and Steel Federation standard). The tensile strength TS and the total elongation TE are measured according to ISO standard ISO 6892-1, published in October 2009. Due to differences in the methods of measurement, in particular due to differences in the geometry of the specimen used, the values of the total elongation TE measured according to the ISO standard are very different, in particular lower, than the values of the total elongation measured according to the JIS Z 2201-05 standard.

Table 1 depicts the Steels with the compositions expressed in percentages by weight. The Steel compositions I1 to I6 serving for the manufacture of sheets according to the invention, this table also specifies the reference steel compositions which are designated in table from R1 to 9.

TABLE 1

| | | | | | Steel compositions | | | | | | |
|---|---|---|---|---|---|---|---|---|---|---|---|
| | C | Mn | Al | Si | Cr | Nb | N | S | P | Si + Al | C + Si/10 |
| I1 | 0.224 | 2.210 | 0.779 | 0.710 | 0.053 | 0.019 | 0.0023 | 0.0037 | 0.011 | 1.489 | 0.30 |
| I2 | 0.221 | 2.050 | 0.775 | 0.724 | 0.056 | 0.020 | 0.0023 | 0.0034 | 0.012 | 1.499 | 0.29 |
| I3 | 0.193 | 2.010 | 0.785 | 0.720 | 0.107 | 0.020 | 0.0024 | 0.0019 | 0.012 | 1.505 | 0.27 |
| I4 | 0.206 | 2.100 | 0.782 | 0.715 | 0.106 | 0.020 | 0.0025 | 0.0020 | 0.010 | 1.497 | 0.28 |

TABLE 1-continued

Steel compositions

| | C | Mn | Al | Si | Cr | Nb | N | S | P | Si + Al | C + Si/10 |
|---|---|---|---|---|---|---|---|---|---|---|---|
| I5 | 0.205 | 2.190 | 0.782 | 0.718 | 0.106 | 0.020 | 0.0025 | 0.0020 | 0.011 | 1.500 | 0.28 |
| I6 | 0.220 | 2.190 | 0.781 | 0.719 | 0.106 | 0.020 | 0.0025 | 0.0019 | 0.012 | 1.500 | 0.29 |
| R1 | 0.190 | 2.010 | 0.023 | 1.170 | 0.01 | 0.020 | 0.0027 | 0.0025 | 0.011 | 1.193 | 0.31 |
| R2 | 0.192 | 2.000 | 0.019 | 1.470 | 0.011 | 0.019 | 0.0280 | 0.0026 | 0.012 | 1.489 | 0.34 |
| R3 | 0.188 | 2.300 | 0.770 | 0.676 | 0.024 | 0.019 | 0.0024 | 0.0018 | 0.012 | 1.446 | 0.26 |
| R4 | 0.197 | 1.610 | 0.761 | 0.680 | 0.311 | 0.020 | 0.0026 | 0.0020 | 0.011 | 1.441 | 0.27 |
| R5 | 0.241 | 1.680 | 0.787 | 0.727 | 0.304 | 0.020 | 0.0027 | 0.0030 | 0.015 | 1.514 | 0.31 |
| R6 | 0.222 | 2.050 | 0.768 | 0.730 | 0.022 | 0.002 | 0.0026 | 0.0033 | 0.012 | 1.498 | 0.30 |
| R7 | 0.220 | 1.840 | 0.762 | 0.731 | 0.011 | 0.030 | 0.0026 | 0.0031 | 0.013 | 1.493 | 0.29 |
| R8 | 0.221 | 2.040 | 0.758 | 0.729 | 0.256 | 0.030 | 0.0028 | 0.0034 | 0.012 | 1.487 | 0.29 |
| R9 | 0.224 | 2.040 | 0.763 | 0.733 | 0.025 | 0.030 | 0.0026 | 0.0032 | 0.013 | 1.496 | 0.30 |

I = according to the invention; R = reference; underlined values: not according to the invention.

Table 2—Process Parameters

Table 2 herein details the annealing process parameters implemented on steel samples depicted in Table 1. Table 1 also shows tabulation of Bainite transformation temperature of inventive steel and reference steel. The calculation of Bainite transformation temperature is performed by using:

$$Bs = 839 - (86*[Mn] + 23*[Si] + 67*[Cr] + 33*[Ni] + 75*[Mo]) - 270*(1 - EXP(-1,33*[C]))$$

Ac1 is calculated using a formula published in "Darstellung der Umwandlungen für technische Anwendungen and Möglichkeiten ihrer Beeinflussung, H. P. Hougardy, Werkstoffkunde Stahl Band 1,198-231, Verlag Stahleisen, Düsseldorf, 1984":

$$Ac1 = 739 - 22*C - 7*Mn + 2*Si + 14*Cr + 13*Mo - 13*Ni.$$

In this formula, Ac1 is in Celsius, and C, Mn, Si Cr, Mo and Ni are the weight % of C, Mn, Si, Cr, Mo and Ni of the steel.

Ac3 is calculated using the software Thermo-Calc®.

The steel samples were heated to a temperature between 1000° C. and 1280° C. and then subjected to hot rolling with a finishing temperature above 850° C. and thereafter coiled at a temperature below 580° C. The Hot rolled coils have been then cold rolled with a thickness reduction between 30 to 80%. These cold rolled steel sheets were subjected to heat treatment as detailed hereunder. They were then hot dip coated in a zinc bath at a temperature of 460° C. and batch annealed during 24 hours.

TABLE 2 hot and cold rolling steps

| | Reheating temperature (° C.) | Finishing temperature (° C.) | Cooling rate (° C./s) | Coiling temperature (° C.) | Cold rolling reduction (%) |
|---|---|---|---|---|---|
| I1 | 1200 | 900 | 35 | 540 | 50 |
| I2 | 1180 | 910 | 37 | 535 | 55 |
| I3 | 1180 | 890 | 40 | 545 | 54 |
| I4 | 1200 | 888 | 42 | 550 | 60 |
| I5 | 1210 | 875 | 38 | 520 | 65 |
| I6 | 1200 | 915 | 39 | 525 | 58 |
| R1 | 1250 | 935 | 26 | 530 | 50 |
| R2 | 1250 | 907 | 27 | 535 | 52 |
| R3 | 1200 | 843 | 35 | 545 | 62 |
| R4 | 1200 | 875 | 45 | 520 | 60 |
| R5 | 1230 | 850 | 43 | 550 | 55 |
| R6 | 1220 | 890 | 38 | 535 | 58 |
| R7 | 1220 | 895 | 32 | 540 | 51 |
| R8 | 1250 | 892 | 37 | 545 | 53 |
| R9 | 1250 | 905 | 45 | 535 | 65 |

TABLE 2 continuous annealing step

| | Ac1 (° C.) | Ac3 (° C.) | Heating rate (° C./s) | Soaking T (° C.) | Soaking time (s) | Cooling rate (° C./s) | Cooling T (° C.) | Holding time (s) |
|---|---|---|---|---|---|---|---|---|
| I1 | 720 | 895 | 4.4 | 820 | 65 | 45 | 475 | 35 |
| I2 | 722 | 905 | 4.4 | 820 | 65 | 45 | 475 | 35 |
| I3 | 723 | 925 | 4.4 | 780 | 65 | 45 | 475 | 35 |
| I4 | 722 | 915 | 4.4 | 820 | 65 | 45 | 475 | 35 |
| I5 | 722 | 905 | 4.4 | 820 | 65 | 45 | 475 | 35 |
| I6 | 721 | 900 | 2.8 | 820 | 100 | 25 | 475 | 53 |
| R1 | 723 | 830 | 4.1 | 820 | 72 | 22 | 475 | 38 |
| R2 | 723 | 840 | 5.2 | 820 | 80 | 17 | 475 | 35 |
| R3 | 720 | 905 | 5.2 | 820 | 80 | 17 | 475 | 49 |
| R4 | 729 | 925 | 5.2 | 820 | 80 | 17 | 475 | 49 |
| R5 | 727 | 915 | 5.2 | 820 | 80 | 17 | 475 | 49 |
| R6 | 721 | 905 | 5.2 | 820 | 80 | 17 | 475 | 49 |
| R7 | 722 | 910 | 5.2 | 820 | 80 | 17 | 475 | 49 |
| R8 | 724 | 905 | 4.4 | 820 | 65 | 45 | 475 | 49 |
| R9 | 721 | 900 | 4.1 | 820 | 72 | 22 | 475 | 49 |

TABLE 2 batch annealing step

| | Heating rate (° C./s) | Soaking temperature (° C.) | Soaking time (h) |
|---|---|---|---|
| I1 | 4 | 300 | 24 |
| I2 | 4 | 210 | 24 |
| I3 | 4 | 210 | 24 |
| I4 | 4 | 210 | 24 |
| I5 | 4 | 210 | 24 |
| I6 | 4 | 210 | 24 |
| R1 | — | — | — |
| R2 | — | — | — |
| R3 | — | — | — |
| R4 | — | — | — |
| R5 | — | — | — |
| R6 | — | — | — |
| R7 | — | — | — |

TABLE 2-continued batch annealing step

|    | Heating rate (° C./s) | Soaking temperature (° C.) | Soaking time (h) |
|----|---|---|---|
| R8 | 4 | 210 | 24 |
| R9 | 4 | 210 | 24 |

Table 3 shows the results of tests conducted in accordance of standards on different microscopes such as Scanning Electron Microscope for determining microstructural composition of both inventive and reference steels.

The results are stipulated in area percentage, except the carbon content of residual austenite which is expressed in weight percent. It was observed that all invention examples have a homogeneous martensite repartition, whereas all comparative examples have a non-homogeneous repartition.

TABLE 3

Microstructures

|    | Residual Austenite | Carbon in residual austenite | Polygonal ferrite | Bainite | Tempered Martensite | Non tempered martensite |
|----|---|---|---|---|---|---|
| I1 | 14 | 1.07 | 45 | 27 | 14 | 0 |
| I2 | 17 | 0.96 | 47 | 31 | 5 | 0 |
| I3 | 14 | 1.00 | 55 | 20 | 11 | 0 |
| I4 | 15 | 0.98 | 50 | 25 | 11 | 0 |
| I5 | 12 | 1.01 | 48 | 27 | 13 | 0 |
| I6 | 12 | 0.99 | 45 | 30 | 13 | 0 |
| R1 | 13 | 1.00 | 20 | 55 | 0 | 12 |
| R2 | 14 | 0.92 | 30 | 40 | 0 | 16 |
| R3 | 8 | 0.96 | 56 | 19 | 0 | 17 |
| R4 | 11 | 1.13 | 60 | 22 | 0 | 7 |
| R5 | 16 | 1 | 60 | 10 | 0 | 14 |
| R6 | 17 | 0.98 | 65 | 15 | 0 | 3 |
| R7 | 17 | 1.04 | 70 | 10 | 0 | 3 |
| R8 | 12 | 0.95 | 45 | 20 | 23 | 0 |
| R9 | 18 | 0.92 | 50 | 29 | 3 | 0 |

I = according to the invention; R = reference; underlined values: not according to the invention.

Table 4 exemplifies the mechanical properties of the inventive steel and reference steels. The tensile test is conducted in accordance of NF EN ISO 6892-1 standard. The hole expansion ratio is measured according to the standard ISO16630:2009 wherein a sample with a 10 punched mm is deformed. After deformation and crack initiation, the hole diameter is measured, and HER % is calculated=100*(Df−Di)/Di.

Henceforth the outcome of the various mechanical tests conducted in accordance of the standards is tabulated herein:

TABLE 4

Mechanical properties

|    | Tensile Strength (MPa) | YS (MPa) | YS/TS | Total Elongation (%) | Hole Expansion Ratio (%) |
|----|---|---|---|---|---|
| I1 | 1000 | 729 | 0.72 | 17 | 23 |
| I2 | 990 | 633 | 0.64 | 18.8 | 21 |
| I3 | 1065 | 735 | 0.69 | 17.3 | 19 |
| I4 | 1040 | 669 | 0.64 | 17.9 | 22 |
| I5 | 1078 | 723 | 0.67 | 17.1 | 18 |
| I6 | 1023 | 641 | 0.63 | 17.4 | 23 |
| R1 | 957 | 459 | 0.48 | 19.4 | 22 |
| R2 | 1008 | 415 | 0.40 | 15.9 | 13 |
| R3 | 1097 | 464 | 0.42 | 12.8 | nd |
| R4 | 913 | 353 | 0.39 | 15.8 | nd |
| R5 | 1010 | 373 | 0.37 | 14.9 | nd |
| R6 | 915 | 398 | 0.43 | 19.4 | nd |
| R7 | 896 | 434 | 0.48 | 17.2 | nd |
| R8 | 1251 | 526 | 0.42 | 9.1 | nd |
| R9 | 1061 | 469 | 0.44 | 17.3 | 10 |

I = according to the invention; R = reference; underlined values: not according to the invention; nd : Not determined.

Regarding the spot weldability, the sheets according to the invention have a low LME sensitivity when the composition is such that C+Si/10≤0.30%. It means that with such steels it is possible to produce structures comprising resistance spot welds, such as car bodies, for which the probability of the number of cracks in the resistance spot welds is such that the mean value is less than 5 cracks per resistance spot weld and the probability to have less than 10 cracks is 98%.

In particular, a welded structure, including resistance spot weld, of at least two steel sheets, can be produced by producing a first steel sheet by a method according to the invention, the first sheet being such that C+Si/10≤0.30% and Al≥6(C+Mn/10)−2.5% and being coated with Zn or a Zn alloy, providing a second steel sheet having a composition such that C+Si/10≤0.30% and Al≥6(C+Mn/10)−2.5%, and resistance spot welding the first steel sheet to the second steel sheet. The second steel sheet may for example be produced by a method according to the invention, and coated with Zn or a Zn alloy.

Thus, a welded structure having a low LME sensitivity is obtained. For example, for such a welded structure comprising at least ten resistance spot welds, the mean number of cracks per resistance spot weld is less than 5.

The steel sheets optionally welded by resistance spot welding according to the invention are used with profit for the manufacture of structural parts in motor vehicles since they offer high formability during the fabrication process and high energy absorption in case of collision. The resistance spot welds according to the invention are also used with profit for the manufacture of structural parts in motor vehicles, since eventual initiation and propagation of cracks located in the welded zones are much reduced.

What is claimed is:
1. A coated steel sheet with a composition comprising the following elements, expressed in percentage by weight:
0.17%≤carbon≤0.24%,
1.9%≤manganese≤2.2%,
0.5%≤silicon≤1%,
0.5%≤aluminum≤1.2%,
Si+Al≥1.3%,
0.05%≤chromium≤0.2%,
0.015%≤niobium≤0.03%,
sulphur≤0.004%,
phosphorus≤0.03%,
optionally containing one or more of the following elements:
0.005%≤Ti≤0.05%,
0.001%≤Mo≤0.05%, and
a remainder including Fe and unavoidable impurities resulting from smelting;
a microstructure of the coated steel sheet comprising, in area fraction, 10 to 20% residual austenite, the austenite phase having a carbon content between 0.9 to 1.1%, 40 to 55% polygonal ferrite, 15 to 40% granular bainite and at least 5% tempered martensite, a sum of tempered martensite and residual austenite being between 20 to 30%;

wherein the coated steel sheet has a tensile strength between 1000 MPa and 1100 MPa and a hole expansion ratio between 18% and 23%.

2. The steel sheet according to claim 1, wherein the composition of the steel includes by weight 0.7%≤Si≤0.9%.

3. The steel sheet according to claim 1, wherein the composition of the steel includes by weight 0.7%≤Al≤0.9%.

4. The steel sheet according to claim 1, wherein the sum of silicon and aluminum is greater than 1.4%.

5. The steel sheet according to claim 1, wherein the carbon and silicon contents are such that C+Si/10≤0.30%.

6. The steel sheet according to claim 1, wherein the aluminum, carbon and manganese contents are such that Al≥6(C+Mn/10)−2.5%.

7. The steel sheet according to claim 1, wherein the sum of residual austenite and tempered martensite is between 25% and 30%.

8. The steel sheet according to claim 1, wherein the steel has a mean tempered martensite fraction (TM*) and a tempered martensite fraction (TM) measured on any area of 50×50 μm² in the steel sheet, such that: |(TM)−(TM*)|≤1.5%.

9. The steel sheet according to claim 1, wherein the steel has a uniform elongation greater than or equal to 17%.

10. The steel sheet according to claim 9, wherein the steel has a yield strength above 550 MPa and a ratio of yield strength to tensile strength of 0.60 or greater.

11. The steel sheet according to claim 1, wherein the steel sheet is hot dip galvanized.

12. A method of manufacturing a coated steel sheet comprising the following successive steps:
providing a semi-finished product with a composition comprising the following elements, expressed in percentage by weight:
0.17%≤carbon≤0.24%,
1.9%≤manganese≤2.2%,
0.5%≤silicon≤1%,
0.5%≤aluminum≤1.2%,
Si+Al≥1.3%,
0.05%≤chromium≤0.2%,
0.015%≤niobium≤0.03%,
sulphur≤0.004%,
phosphorus≤0.03%,
optionally containing one or more of the following elements:
0.005%≤Ti≤0.05%,
0.001%≤Mo≤0.05%, and
a remainder including Fe and unavoidable impurities resulting from smelting;
reheating the semi-finished product to a temperature between 1000° C. and 1280° C.;
rolling the semi-finished product completely in the austenitic range wherein a hot rolling finishing temperature is greater than or equal to 850° C. to obtain a hot rolled steel sheet;
cooling the hot rolled steel sheet at a cooling rate of 35 to 55° C./s to a coiling temperature less than or equal to 580° C.; and coiling the hot rolled sheet;
cooling the hot rolled sheet to room temperature;
pickling the hot rolled steel sheet;
cold rolling the hot rolled steel sheet to obtain a cold rolled steel sheet; then
continuously annealing the cold rolled steel sheet at a heating rate of 1 to 20° C./s up to a soaking temperature between Ac1 and Ac3 at a duration less than 600 s; then
cooling the sheet at a rate greater than 25° C./s to a temperature between 400 and 480° C.;
holding the cold rolled steel sheet for a duration of 20 to 250 seconds;
coating the cold-rolled steel sheet by hot dipping in a zinc or zinc alloy bath;
cooling the cold-rolled steel sheet to room temperature; then
batch annealing the coated cold rolled steel sheet at a rate between 1° C./s to 20° C./s to a soaking temperature of 170 to 350° C. for a duration of 12 to 250 h, and then cooling the sheet down to room temperature.

13. The method of production of a coated steel sheet according to claim 12, wherein the coiling temperature is lower than a bainite transformation start temperature Bs.

14. The method of production of a coated steel sheet according to claim 12, wherein the soaking temperature is between 780° C. and 900° C., and soaking is performed for 10 to 600 s.

15. The method of production of a coated steel sheet according to claim 12, wherein the sheet is cooled at a cooling rate greater than 30° C./s after continuous annealing to a temperature between 400° C. to 480° C.

16. The method of production of a coated steel sheet according to claim 15, wherein the steel sheet is cooled at a cooling rate less than 20° C./s after being coated in a zinc or zinc alloy bath.

17. The method of production of a coated steel sheet according to claim 12, wherein the steel sheet is batch annealed between 170° C. and 250° C. for 12 to 30 h.

18. The steel sheet according to claim 1, wherein the microstructure of the steel sheet consists of residual austenite, polygonal ferrite, granular bainite and tempered martensite.

19. A hot-dip galvanized steel sheet with a composition comprising the following elements, expressed in percentage by weight:
17%≤carbon≤0.24%,
1.9%≤manganese≤2.2%,
0.5%≤silicon≤1%,
0.5%≤aluminum≤1.2%,
Si+Al≥1.3%,
0.05%≤chromium≤0.2%,
0.015%≤niobium≤0.03%,
sulphur≤0.004%,
phosphorus≤0.03%,
optionally containing one or more of the following elements:
0.005%≤Ti≤0.05%,
0.001%≤Mo≤0.05%, and
a remainder consisting of iron and unavoidable impurities resulting from smelting,
a microstructure of the hot dip galvanized steel sheet comprising, in area fraction, 10 to 20% residual austenite, the austenite phase having a carbon content between 0.9 to 1.1%, 40 to 55% of polygonal ferrite, 15 to 40% granular bainite and at least 5% of tempered martensite, the hot dip galvanized steel being free from non tempered martensite, the sum of tempered martensite and residual austenite being between 20 to 30%, the hot dip galvanized steel sheet having an ultimate tensile strength between 1000 MPa and 1100 MPa, a total elongation of 17% or more and a hole expansion ratio between 18% and 23%, as measured in accordance with ISO standard 16630:2009.

20. The steel sheet according to claim 19, wherein the composition of the steel includes by weight 0.7%≤Si≤0.9%.

21. The steel sheet according to claim 19, wherein the composition of the steel includes by weight 0.7%≤Al≤0.9%.

22. The steel sheet according to claim 19, wherein the sum of silicon and aluminum is greater than 1.4%.

23. The steel sheet according to claim 19, wherein the carbon and silicon contents are such that C+Si/10≤0.30%.

24. The steel sheet according to claim 19, wherein the aluminum, carbon and manganese contents are such that Al≥6(C+Mn/10)−2.5%.

25. The steel sheet according to claim 19, wherein the sum of residual austenite and tempered martensite is between 25% and 30%.

26. The steel sheet according to claim 19, wherein the steel has a mean tempered martensite fraction (TM*) and a tempered martensite fraction (TM) measured on any area of 50×50 μm² in the steel sheet, such that: |(TM)−(TM*)|≤1.5%.

27. The steel sheet according to claim 19, wherein the steel has a yield strength above 550 MPa and a ratio of yield strength to tensile strength of 0.60 or greater.

* * * * *